July 7, 1970

M. LERNER 3,519,135

FILTER TANK

Filed April 24, 1968

INVENTOR.
MARC LERNER

ATTORNEYS

July 7, 1970  M. LERNER  3,519,135
FILTER TANK
Filed April 24, 1968  3 Sheets-Sheet 2
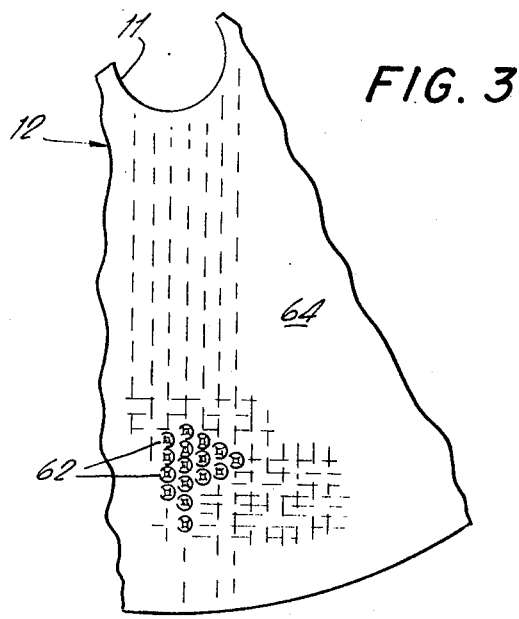
FIG. 3
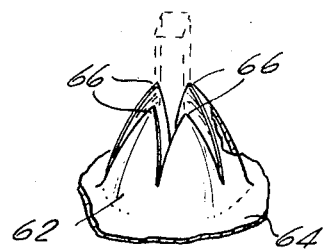
FIG. 4
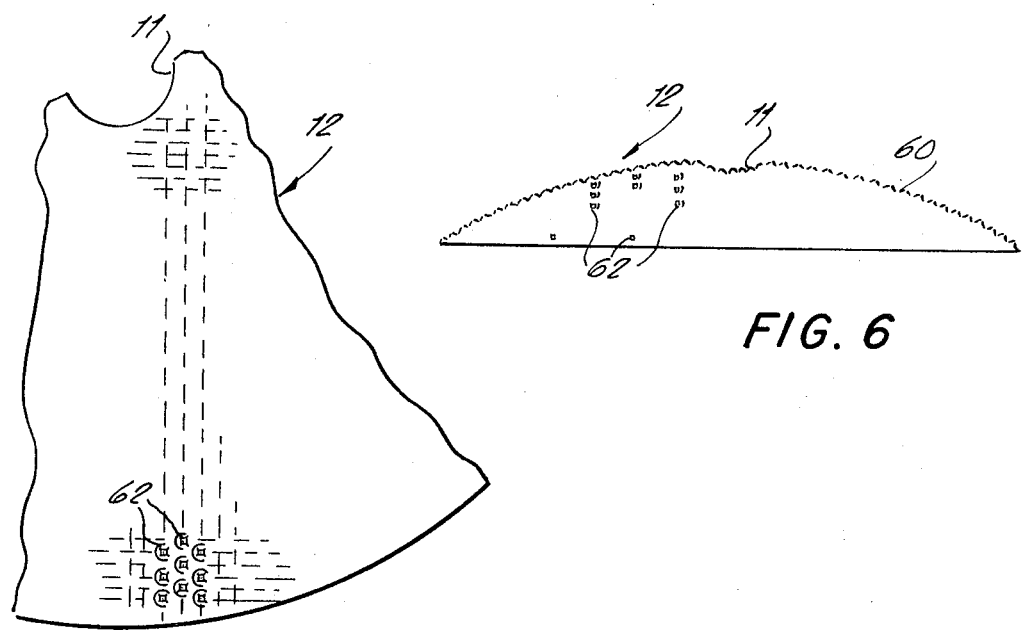
FIG. 5
FIG. 6
INVENTOR.
MARC LERNER
BY
ATTORNEYS July 7, 1970

M. LERNER 3,519,135

FILTER TANK

Filed April 24, 1968

INVENTOR.
MARC LERNER

BY Friedman Goodman

ATTORNEYS 3,519,135
FILTER TANK
Marc Lerner, Swan Lake, N.Y. 12783
Filed Apr. 24, 1968, Ser. No. 723,787
Int. Cl. B01d 29/08
U.S. Cl. 210—289
8 Claims

ABSTRACT OF THE DISCLOSURE

The invention is directed to providing an improved filter tank having an improved underdrain plate, valve assembly, and tank sealing means; the underdrain plate comprising a dome-shaped member provided with a plurality of closely spaced openings having a specifically defined construction, the valve assembly comprising a pair of valve discs connected by a valve shaft within a valve chamber, said valve chamber having a plurality of openings acting in association with said valve discs to provide for ingress or egress of liquids therethrough, the tank sealing means being provided on the tank head and comprising a mounting collar integrally formed in the tank head and a detachable sealing unit therefor, said mounting collar defining opening means into said tank.

BACKGROUND OF THE INVENTION

Field of the invention

The invention relates generally to filter tanks for purifying liquids, such as water, having particular reference to that class of filter tanks in which a granular bed of filter media is used for filtering the water.

Description of the prior art

Heretofore difficulty has been experienced in effecting proper distribution of the flow of wash water through a filter bed, the usual practice being to backwash or reverse the flow of water through the filter at frequent intervals to loosen and carry off the dirt and impurities accumulated in the filter bed. In backwashing, the tendency is for the flow to concentrate at points in the granular filter bed where the resistance thereto is relatively weak owing to the variation in density of the filter bed by reason of some portions becoming more clogged with sediment than others or to the uneven distribution of the granular filter media. Consequently the water breaks through at the points that are less clogged and forms channels through which the greatest portion of the backwash water continues to pass without cleaning the balance of the filter bed. When the filter is returned to the filter cycle, the raw water supplied to the filter flows freely through these channels without being thoroughly cleansed of suspended impurities.

Various underdrain configurations are being used to insure the uniform flow of water through the filter bed during backwashing. These include perforated screens, slotted or drilled lateral piping arrangements and porous discs or rods. These eliminate the problem of channeling in the filter to varying degrees; however, none of these eliminate the problem of stratification (i.e., the separation into layers of equal particle size) of the granular filter bed. This is the result of the smaller particles, which are lighter, being carried to the top of the filter bed during backwashing and resettling in layers with the smallest particles on the top of the bed and the largest on the bottom. The longer a filter is used and the more it is backwashed, the more defined the stratification becomes.

A filter bed which has become stratified has a shorter filter cycle and a limited dirt holding capacity since all of the dirt must be held on the surface of the filter bed. Any particles of dirt which pass through the fine upper layer of the filter bed cannot be held by the succeeding layers of coarser material beneath it.

Some filter manufacturers have attempted to make smaller filters of higher capacity by increasing the flow rate of liquid per square foot of filter area, theorizing that the impurities in the liquid being filtered will not stop on the filter bed's surface but will penetrate the surface and be held in the spaces between the granules deeper in the filter bed. This theory has proved correct and works well when the filter is new, but as the filter is backwashed the granules begin to stratify and the efficiency is greatly reduced.

An attempt to eliminate the problem of stratification of the filter bed by blending granules of varying specific gravity with the largest particles having the lowest weight has been made but the high cost and the difficulty of making such a blend has made this system impractical.

Another problem in filters is that the valve discs in conventional slide valve assemblies have a tendency towards displacement of their respective O rings. This is caused by virtue of the fact that the O ring has to pass a large opening in the valve chamber with the result that the O ring has a tendency to expand and be dislodged as it passes the edge of the opening in the valve chamber.

Still another problem in current filtration tanks is that the opening in the tank through which the tank is filled with filter media has to have a collar welded thereon. A detachable sealing plate and gasket are then fastened to the collar by means of a yoke and a drawbolt which pull the sealing plate and its gasket against the collar.

SUMMARY OF THE INVENTION

It is, therefore, among one of the principal objectives of this invention to provide an improved filter tank in which all of the aforementioned, attendant, prior art disadvantages are eliminated.

In accordance with the present invention there has now been provided an underdrain plate for a filter tank comprising a substantially dome-shaped member provided with a plurality of closely spaced openings, each of said openings having a generally 4-pronged configuration when viewed from the top of said dome.

In another specific embodiment of the invention there is provided an improved valve assembly for a filter tank comprising at least a pair of valve discs connected by a valve shaft within a valve chamber, said valve chamber having a plurality of openings, arranged in circular fashion, which openings act in association with said valve discs to provide for ingress or egress of liquids therethrough as desired.

In still a further specific embodiment there is provided an improved tank sealing means for the head of a filter tank which means comprise a mounting collar integrally formed within the tank head and a detachable sealing unit therefor, said mounting collar defining opening means into said tank.

BRIEF DESCRIPTION OF THE DRAWING

The invention will be hereinafter more fully described with reference to the accompanying drawings, in which:

FIG. 3 is a top plan view of the invention underdrain plate, partially fragmented;

FIG. 4 is a view in perspective of one of the specially constructed openings of the invention underdrain plate shown in FIG. 3;

FIG. 5 is a bottom plan view of the invention underdrain plate, partially fragmented;

FIG. 6 is a view taken along the line 6—6 of FIG. 3 in the direction of the arrows appearing above the numerals;

DESCRIPTION OF THE PREFERRED EMBODIMENTS

Figure 1:
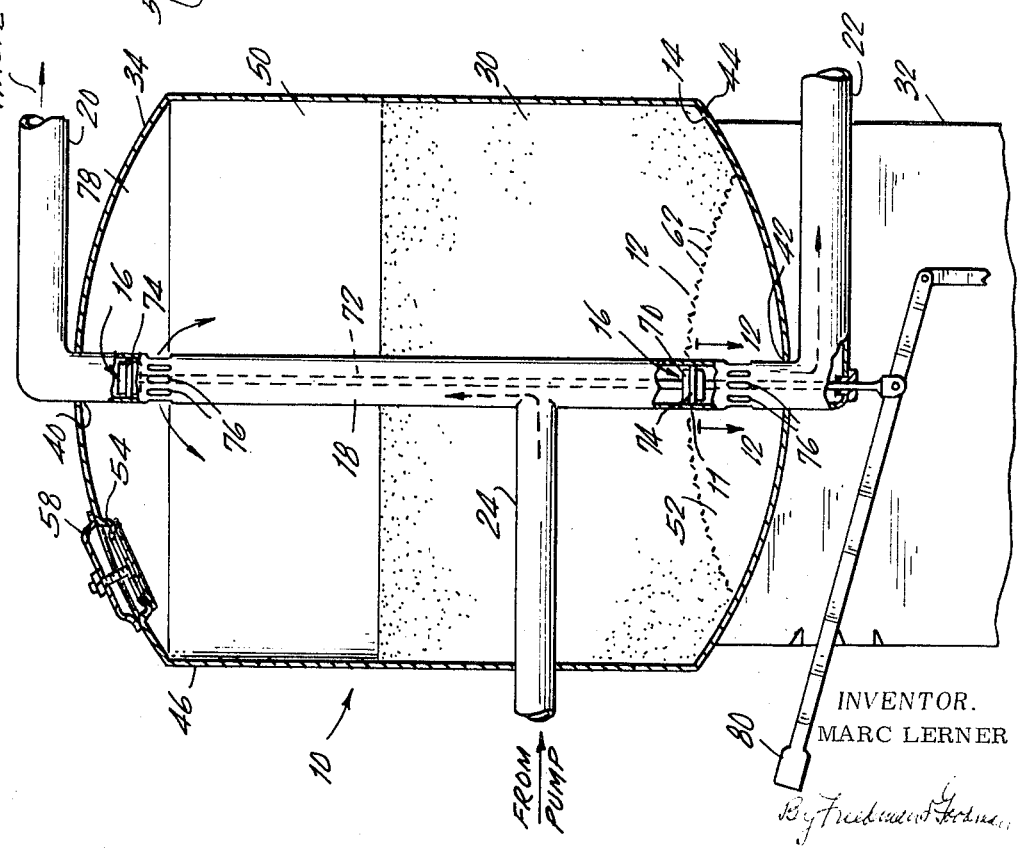
FIG. 1 is a cut-away elevational view of an improved filter tank according to one embodiment of the invention and showing the relative positions of the improved underdrain plate, valve assembly and tank sealing means therein.
Figure 7:
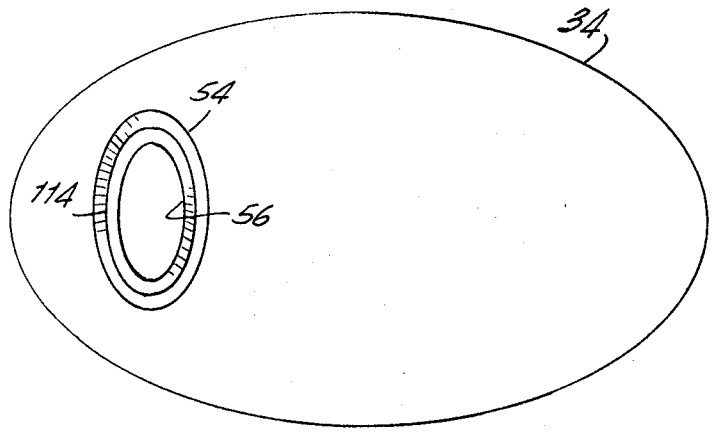
FIG. 7 is a top plan view of the tank head of the filter tank of the invention, showing a mounting collar integrally joined thereto.
Figure 9:
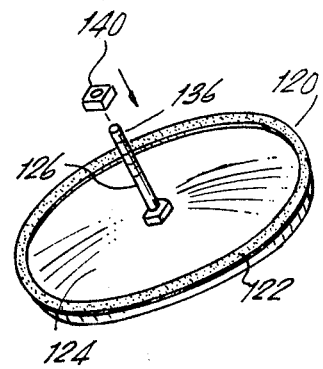
FIG. 9 is a view in perspective of the sealing plate for the tank head of FIG. 7.
Figure 8:
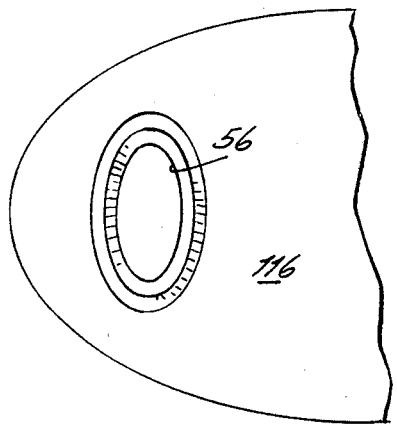
FIG. 8 is a bottom plan view of the tank head of FIG. 7, in fragmentary form.
Figure 10:
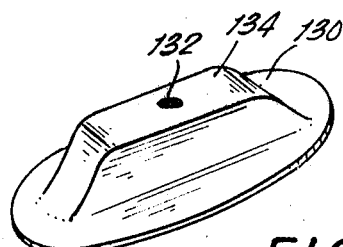
FIG. 10 is a view in perspective of the securing member or yoke which affixes the sealing plate of FIG. 9 to the mounting collar by means of the raised bolt and its nut.
Figure 11:
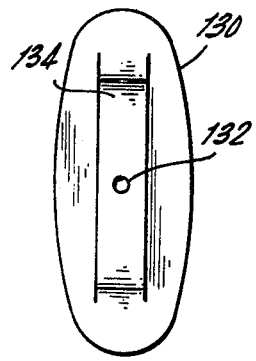
FIG. 11 is a bottom plan view of the securing member of FIG. 10, FIGS. 9 and 10 constituting the sealing unit for the tank head of FIG. 7, as shown in detached relationship.
Figure 12:
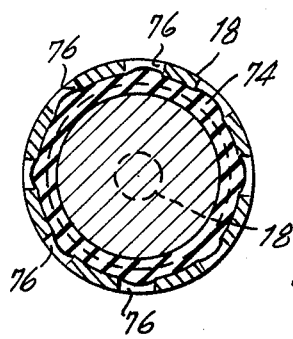
FIG. 12 is a plan view of the valve 16 taken along line 12—12 of FIG. 1.

Referring now to the figures of the drawings, wherein like parts will be identified by like reference numerals, for purposes of illustration, FIG. 1 depicts a filter tank 10 (for a swimming pool, not shown), an underdrain plate 12 supported by fastening it in the annular recess or concavity 14 formed at the bottom of the tank, a valve assembly 16 located concentrically in a valve chamber 18 therefor, a waste pipe 20 joined to the upper end of chamber 18, a filtered water pipe 22 joined to the lower end of the chamber 18 and a raw water pipe 24 leading from a suitable conventional pump (not shown) into chamber 18.

Tank 10 is of conventional construction and may be of either round or cylindrical shape. Granular filtering media 30 is provided inside the tank for liquid filtration purposes which will be more fully described subsequently. Tank 10 is secured to and rests on a suitable base support 32 which is of conventional design and is only partly shown. Tank 10 is provided with a tank head 34 which will be more fully described hereinbelow. Valve chamber 18 is in approximate central vertical relationship to the inside of tank 10 and the central aperture 11 of plate 12 and pipes 20 and 22 leading outside of the tank, as aforementioned, are joined at right angles thereto; pipe 20 exiting from upper port 40 in tank head 34, and pipe 22 exiting from lower port 42 of tank bottom 44. The pipe 24 leading from the water pump (not shown) enters the side 46 of the tank and joins valve chamber 18 at right angles thereto between the height of filter media 30 which rests on underdrain plate 12 and the portion of concavity 14 surrounding underdrain plate 12; underdrain plate 12 being welded to the shell of the concavity 14 through its entire circumference. The filter media 30 fills approximately ½ of the tank's interior forming an upper collection chamber 50. Beneath underdrain plate 12 is another collection chamber, lower collection chamber 52. The functions of both chambers will become subsequently more fully described.

Tank head 34 contains a mounting collar 54 defining an opening 56 into the tank 10 and a sealing unit 58 therefor which parts will also be subsequently more fully described.

As indicated previously, valve chamber 18 passes vertically through central aperture 11 of underdrain plate 12. Underdrain plate 12, FIGS. 3–6, comprises a substantially preferably dome-shaped member, although it could be flat, containing a central aperture 11 for the passage of valve chamber 18 therethrough. Provided along the domed wall 60 of underdrain plate 12 are a plurality of pyramid shaped, closely spaced openings 62 which are pierced into wall 60 by means of a suitable pointed square punch to make an opening through which the average sized grain of filter media will not pass. The openings 62 are punched from the direction of the inside of the domed member, making up the underdrain plate 12, to the outside thereof, with the result that the bottom of each opening 62 is generally preferably square shaped (FIG. 5), although it could also be conical or triangular, while the upper end emerging from the top surface 64 of the plate 12 is essentially preferably of 4-pronged construction, note FIG. 5, although it could also be of 3- or 2-pronged construction. By virtue of this construction (pronged) a grain of filter media impinged on the point of each prong 66 will still not block opening 62 to the passage of water therethrough since there are resultant spaces between the prongs 66. The pyramid shape (64) of the sides of the openings 62 form a small nozzle creating a jetting action when water passes upwardly therethrough as will be described below.

Referring now to valve assembly 16, it comprises a pair of valve discs 70 and 71 connected in spaced relationship by a valve shaft 2. The valve discs 70 and 71 are of conventional construction and each contains an O ring 74 (rubber) disposed inside a peripheral channel provided for that purpose. The valve assembly 16 is concentrically and vertically disposed inside valve chamber 18. At each end of valve chamber 18 are provided a plurality of preferably oblong apertures 76 arranged in annular fashion around the wall of valve chamber 18, apertures 76 acting in association with the upper and lower valve discs 70, 71 respectively. One set of apertures 76 is located at the upper end of valve chamber 18, which is itself in turn located at the upper portion 78 of collection chamber 50. Another set of apertures 76 is located at the lower end of valve chamber 18, which is itself, in turn, located inside collection chamber 52. An operating lever 80 is pivotally connected by conventional means to valve shaft 72 for purposes of raising and lowering the valve discs to the desired positions, as will be described more fully, presently.

Describing now the operation of the improved filtration system with particular reference to FIG. 1, raw water to be filtered is pumped via water pipe 24 into valve chamber 18 with the operating lever in the filtering, raised, position (i.e., lower valve disc 71 is disposed inside chamber 18 in the region of aperture 11 of underdrain plate 12 with O ring 74 sealing off water flow in the direction of collection chamber 52 and upper valve disc 70 is disposed above its associated apertures 76, its O ring sealing off water flow into the waste pipe 20). The water flows upwardly through valve chamber 18 in the direction of the arrows and emerges through apertures 76 associated with upper valve disc 70 and flows into the collection chamber 50 whereby it proceeds to filter down through filter media 30 contained in the lower half of the tank. Finally, the filtered water reaches the underdrain plate 12 whence it passes through openings 62 into collection chamber 52. From collection chamber 52 the filtered water enters apertures 76 associated with lower disc 71 and is carried to the pool by means of filtered water pipe 22 in the direction of the arrows.

When sludge and sediment has accumulated to such an extent as to require back-flushing of the filter media, what is done is to lower the operating lever 80 to the position wherein upper valve disc 70 is just below its associated apertures 76 and water is sealed therefrom by the O ring. Lower valve disc 1 is located below its associated apertures 76 and the action of the O ring seals the filtered water pipe. Now, when water is pumped in via pipe 24 it collects in chamber 52 through lower apertures 76 and water is thence forced up through openings 62 into and through filter media 32 whence the water now collects in chamber 50 and finally passes through the upper apertures 76 into waste pipe 20. By virtue of the disposition of the closely spaced pronged openings 62 on the domed underdrain plate the water that back-flushes the filter media is radially directed thereto, as by the small nozzles, which create the aforementioned jet-type action, by virtue of the limiting action of the nozzles or jets to the water, forming a buildup of water pressure which displaces the particles of filter media. Thus, the stratification of the filter media into varying finer density layers is prevented, thereby achieving a uniform distribution of the particle sizes of the filter media so that the finer and coarser particle sizes of filter media are uniformly intermixed and not separated out, as in the prior art. This so because the mixing action created by the "jets" of water drives the large particles up into the filter bed permitting the fines to settle to the lower portion of the filter bed. With the dome-shaped underdrain the "jets" are advantageously radially directed as indicated by the arrows and permit the use of a smaller area underdrain.

A tremendous advantage of the valve assembly of the invention is that now when the valve discs are raised and lowered, the prior art problems of dislodgment of the O rings is eliminated, because the O rings now do not have to pass a large opening which resulting hang-ups on sharp corners but rather the O rings pass a plurality of annularly spaced apertures presenting a series of narrow spaces rather than one large one. Thus, the force which might dislodge the O ring is distributed to the entire circle rather than a single concentrated section. By aligning 2 or 3 of these valves and operating them with a single shaft with the spools or discs attached to a common shaft, it is possible to control the flow of water in a varying number of directions for such applications as water filters, water softeners, dry cleaning equipment, etc.

A variation of the principle of this valve would be the O or sealing rings retained within grooves in the body of the valves and groups of passages arranged within the spool or plunger portion of the valve.

Figure 2:
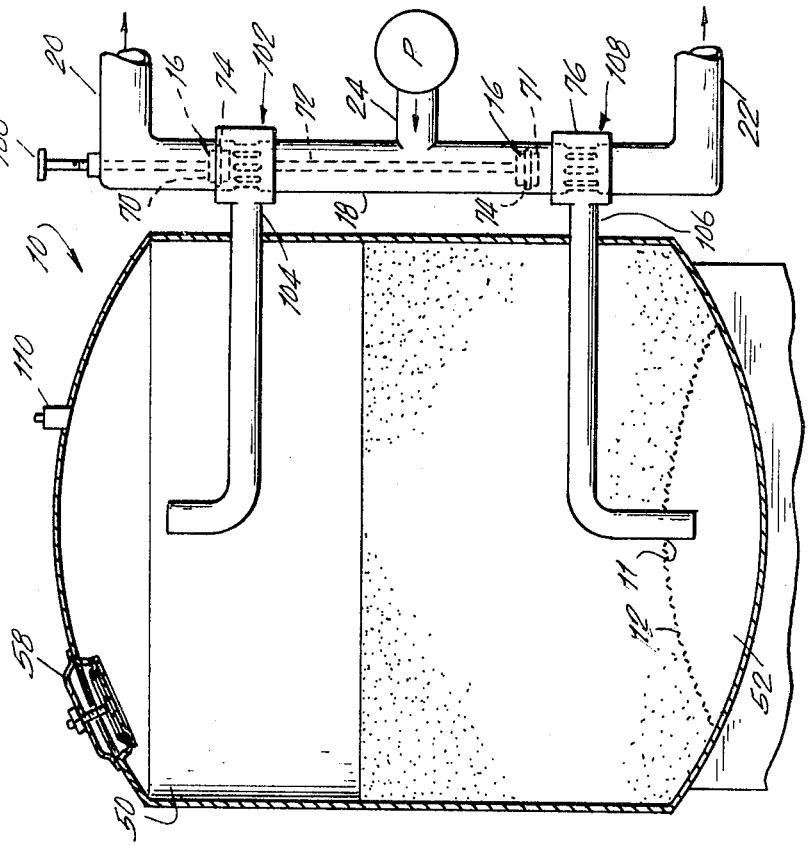
FIG. 2 is a view similar to FIG. 1 and showing another embodiment of the invention wherein the valve assembly of the invention is provided externally of the filter tank.

Turning now to FIG. 2, the operation of the filtration system is the same as that just described except that in this particular embodiment the valve assembly 16 is located outside the filter tank 10. When the valve handle 100 is in the raised position (as shown), water under pressure from the pump flows up and through the upper valve chamber 102 and into the pipe 104 in the top chamber 50 of the filter tank 10. This pipe 104 is turned upward so that the water entering the filter from this pipe does not flow directly onto the filter media bed. The water is forced through the filter media bed which filters it and is collected in the lower collection chamber 52 through the openings 62 in the underdrain plate 12. From there it flows through the lower pipe 106 to the lower valve chamber 108. Since the lower valve disc 71 is in the upper position, the water flows through the valve openings into the filtered water pipe 22.

The discs 70, 71 are arranged on the valve shaft 72 so that when the valve handle 100 is depressed half way the upper valve disc 70 passes the apertures 76 in the upper valve chamber 102 stopping the flow of water to the top of the tank. The lower disc 71 has not traveled far enough to pass the openings in the lower valve. This position seals the pump from the tank (as is also the case with FIG. 1).

When the valve handle 100 is depressed completely, the lower valve disc 71 passes the apertures 76 in the lower valve chamber 108 and permits water from the pump to flow into the collection chamber 52. The water is forced through the pierced openings 62 in the underdrain plate 12. This agitates the filter media and loosens the dirt trapped between the particles of filter media. The dirt is carried up by the water and into the pipe 104 in the top of the tank from which it passes through the apertures 76 in the upper valve chamber 102 and into the backwash water line 20. An air vent 110 for the tank is also provided.

With reference to another embodiment of the invention as shown by FIGS. 7–11, there is shown a tank head, as 34 for example, and having integrally pressed therein a mounting collar 54 defining an oval opening 56 into the tank's interior. The mounting collar 54 has a lip or raised portion 115 immediately adjacent the opening 56 which integrally merges into the depressed channel 114 to form on the inside 116 of tank head 34 a conversely deflected or raised ridge 118. The sealing unit 58 for the head comprises a base plate or sealing cap 120 of oval shape and having a rubber gasket 122 running around the border of the outer face 124 thereof. Centrally located on face 124 is an upwardly, vertically extending threaded raised bolt 126. When it is desirous to seal the tank head what is done is to superimpose rubber gasket 122 on ridge 118 of said head so that said bolt 126 extends upwardly through opening 56; thence the securing member 130, shaped generally in a hat-like rigidifying configuration with a centrally located aperture 132 disposed in the top 134 of the "hat," is made to overlie the face 122 of base plate 120 in lengthwise relation thereto with the raised bolt 126 inside aperture 132 and extending therethrough so that the threaded portion 136 of the bolt is exposed, and finally threaded nut 140 is associatingly threaded onto bolt portion 136 thereby drawing the sealing cap 120 and rubber gasket 122 against ridge 118 formed in the tank head and sealing same.

It is to be understood that the various invention components of the filter tank as described, e.g. underdrain plate, valve assembly and tank sealing means are made of a suitable material, such as suitable steel, except where otherwise specified.

Having thus described the invention as applied to specific embodiments thereof, it is to be understood that various changes may be made by those skilled in the art without departing from the spirit and scope thereof.

What is claimed is:

1. An underdrain plate for a filter tank comprising a strainer member provided with a plurality of closely spaced openings, said strainer member including means surrounding said openings so as to enable a jetting action for a liquid passing upwardly through said openings, said last mentioned means comprising a multi-pronged configuration extending outwardly from each of said openings of said strainer member and adjacent prongs defining unobstructed spaces therebetween which effectively serve as nozzles to create said jetting action.

2. An underdrain plate according to claim 1, wherein said strainer member further comprises a substantially dome-shaped member, said member being further characterized by having a dome-shaped wall, and said domed wall being provided with said plurality of closely spaced openings.

3. An underdrain plate according to claim 2, wherein the base portion of each of said openings is substantially square-shaped.

4. An underdrain plate according to claim 2, wherein the base portion of each of said openings is conical.

5. An underdrain plate according to claim 2, wherein the base portion of each of said openings is triangular.

6. An improved filter tank in combination with the underdrain plate of claim 1.

7. An underdrain plate according to claim 2, wherein each of said openings is 4-pronged.

8. An underdrain plate for a filter tank comprising a strainer member provided with a plurality of openings, each of said openings having integrally formed multi-pronged configurations extending outwardly of said strainer member with adjacent prongs defining closely spaced unobstructed jets therebetween which create a jetting action to water passing upwardly therethrough, said jets by their limiting action forming a buildup of water pressure which displaces particles of filter media resting on said strainer member.

(References on following page)

References Cited

UNITED STATES PATENTS

| | | | |
|---|---|---|---|
| 791,213 | 5/1905 | Roberts | 210—289 X |
| 1,196,058 | 8/1916 | Widner | 210—293 X |
| 1,668,205 | 5/1928 | Hughes | 210—293 X |
| 2,155,964 | 4/1939 | Bowers et al. | 210—292 |
| 3,178,024 | 4/1965 | Jacuzzi | 210—288 X |

SAMIH N. ZAHARNA, Primary Examiner

U.S. Cl. X.R.

210—277; 239—567, 601